United States Patent
Christy et al.

(10) Patent No.: US 6,808,361 B1
(45) Date of Patent: Oct. 26, 2004

(54) APPARATUS AND METHOD FOR STACKING FOOD PORTIONS

(75) Inventors: Michael D. Christy, Locust, NC (US); John T. McCarthy, 416 Nance Rd., Stanfield, NC (US) 28163; Jay P. Phillips, Concord, NC (US)

(73) Assignee: John T. McCarthy, Stanfield, NC (US)

( * ) Notice: Subject to any disclaimer, the term of this patent is extended or adjusted under 35 U.S.C. 154(b) by 7 days.

(21) Appl. No.: 10/107,845

(22) Filed: Mar. 27, 2002

(51) Int. Cl.[7] .............................................. B65G 57/00
(52) U.S. Cl. .................... 414/798.7; 198/418.9
(58) Field of Search ......................... 414/798.2, 798.7, 414/901; 198/958, 418.9, 419.1; 271/182, 177

(56) References Cited

U.S. PATENT DOCUMENTS

| | | | |
|---|---|---|---|
| 2,687,207 A | 8/1954 | Meyer | 198/35 |
| 2,748,917 A | 6/1956 | Rawe | 198/35 |
| 3,359,874 A | 12/1967 | Stegenga et al. | 93/93 |
| 3,610,401 A | 10/1971 | Herendeen et al. | 198/35 |
| 3,842,719 A | 10/1974 | Fernandez-Rana et al. | 93/93 M |
| 3,870,139 A | 3/1975 | Wagner | 198/34 |
| 3,948,153 A | 4/1976 | Dutro et al. | 93/93 C |
| 3,964,598 A | 6/1976 | Alsop | 198/35 |
| 3,983,987 A | 10/1976 | Lynch | 198/480 |
| 4,125,253 A * | 11/1978 | Wangermann | 414/794.4 X |
| 4,132,304 A | 1/1979 | Gent et al. | 198/432 |
| 4,135,616 A | 1/1979 | Pellaton | 198/423 |
| 4,231,465 A | 11/1980 | Bourgeois | 198/460 |
| 4,266,654 A | 5/1981 | Achelpohl et al. | 198/425 |
| 4,360,098 A | 11/1982 | Nordstrom | 198/419 |
| 4,610,347 A | 9/1986 | Inoko | 198/425 |
| 4,652,197 A | 3/1987 | Littleton | 414/50 |
| 4,759,433 A | 7/1988 | Kraft | 198/422 |
| 4,868,471 A | 9/1989 | Braithwaite | 318/567 |
| 4,921,088 A | 5/1990 | Ter Horst | 198/418.7 |
| 5,020,305 A * | 6/1991 | Treiber | 198/418.9 X |
| 5,064,050 A | 11/1991 | Stadler | 198/459 |
| 5,100,124 A | 3/1992 | Pouliquen | 271/183 |
| 5,667,055 A | 9/1997 | Gambetti | 198/419.3 |
| 5,810,550 A | 9/1998 | Reaves | 414/788.1 |

* cited by examiner

Primary Examiner—Donald W. Underwood
(74) Attorney, Agent, or Firm—Womble Carlyle Sandridge & Rice, PLLC

(57) ABSTRACT

An apparatus for the counting and stacking of food portions in preparation for packaging, and without human intervention, including a conveyor for receiving and moving food portions therealong to form rows of food portions, at least one counter, and a stacking rake positioned with respect to said conveyor as to moveably shuffle the rows of food portions into a horizontal stack for packaging. The conveyor, counter, and stacking rake are cooperatively interconnected by a programmable computer so that the rows of food portions are moved along the conveyor for stacking by the stacking rake.

16 Claims, 6 Drawing Sheets

APPARATUS AND METHOD FOR STACKING FOOD PORTIONS

FIELD OF THE INVENTION

The present invention relates to the field of food handling and packaging, and, more particularly to an apparatus and method for stacking frozen food portions, such as hamburger patties or the like, in preparation for packaging, and without the need for human contact.

BACKGROUND OF THE INVENTION

Numerous advances have been made in the food processing and packaging industries over the last several decades. These advances, in large part, have been directed to automated handling and packaging systems for increasing the "assembly line" output, i.e., volume, of the food processing operation. Examples include machines for filling and sealing containers, stackers, sorters, and counters/measurement devices. Primary objectives of these systems have been cost reduction and accuracy. A large number of these systems have also been devised for use with final, processed, foods such as snacks, beverages, processed canned products, etc.

A different set of problems has evolved in recent years with respect to the handling and packaging of uncooked, or raw, food products, particularly meats. Concerns of tainted, or contaminated meat due to improper handling and processing of the raw meat products, such as ecoli, have given rise to increased governmental oversight. Additionally, concerns associated with human contact and the passage of human contamination during the cooking stage and service of food products have prompted higher workplace standards. One notable example is the passage of hepatitis. As fast food restaurants and the like have proliferated, so have the concerns over tainted food and incidents of food poisoning. Accordingly, product liability issues have arisen. Food processors and packagers are bearing high costs from the liabilities associated with human contact, and hence, contamination.

Yet, despite the advances made in automation and packaging, there has not heretofore been an effective, practical ways to eliminate human contact with raw meat products. At some point in the forming and packaging process, human contact with raw product has been necessary. Meat packers have, thus, found themselves increasingly culpable when cases of contamination arise, and have borne substantial losses over precautionary recalls of products when the source of the contamination has been indeterminate.

SUMMARY OF THE INVENTION

The present invention is directed to an apparatus for efficiently stacking predetermined numbers of food portions, such as frozen hamburger patties, received from bulk bins, or directly from a freezer, in preparation for subsequent packaging, and without the need for human contact.

In a preferred embodiment, the apparatus for stacking food patties includes a conveyor, counters, gates, and a stacking rake. In one embodiment, the conveyor comprises first and second conveying belts. The first, receiving conveying belt receives flat, frozen patties from a bulk bin, hopper, or freezer, at its first, or receiving, end. The belt is mechanically driven for moving patties along the length of the belt away from the bin or hopper and toward its second end. A first counter is desirably positioned above or below the first conveying belt so as to count patties passing a selected point along the first conveying belt. The first gate is positioned downstream of the counter for stopping and preventing further movement beyond a second selected point. The first counter and the first gate are electronically interconnected so that the first gate will open, or lift, when a preselected number of patties have passed by the counter.

When the first gate opens, the chain of patties are permitted to continue moving along the first conveying belt toward the second end of the first belt. A second counter is positioned near the end of the first belt for determining when a preselected number of patties have reached the end of the first belt and dropped onto the first end of the second conveying belt.

The second conveying belt is positioned with a first end slightly lower than the second end of the first conveying belt. The second conveying belt is started and stopped by the electronically interconnected second counter. A second gate is positioned just downstream of the first end of the second conveying belt and oriented so as to cause the initial patties arriving on the second conveying belt to shingle one upon the other. The second gate is a substantially flat lever that is pivotally mounted above the second conveying belt. In its initial position, the second gate forms a predetermined acute angle with respect to first end of the second conveying belt.

A stacking rake is positioned above and oriented along the longitudinal axis of the second conveyor belt for shuffling the patties into a horizontal stack and sliding the stack to the second end of the second conveying belt.

These and other aspects of the present invention will become apparent to those skilled in the art after a reading of the following description of the preferred embodiments when considered in conjunction with the drawings. It should be understood that both the foregoing general description and the following detailed description are exemplary and explanatory only and are not restrictive of the invention as claimed.

DETAILED DESCRIPTION OF THE PREFERRED EMBODIMENTS

Figure 1:
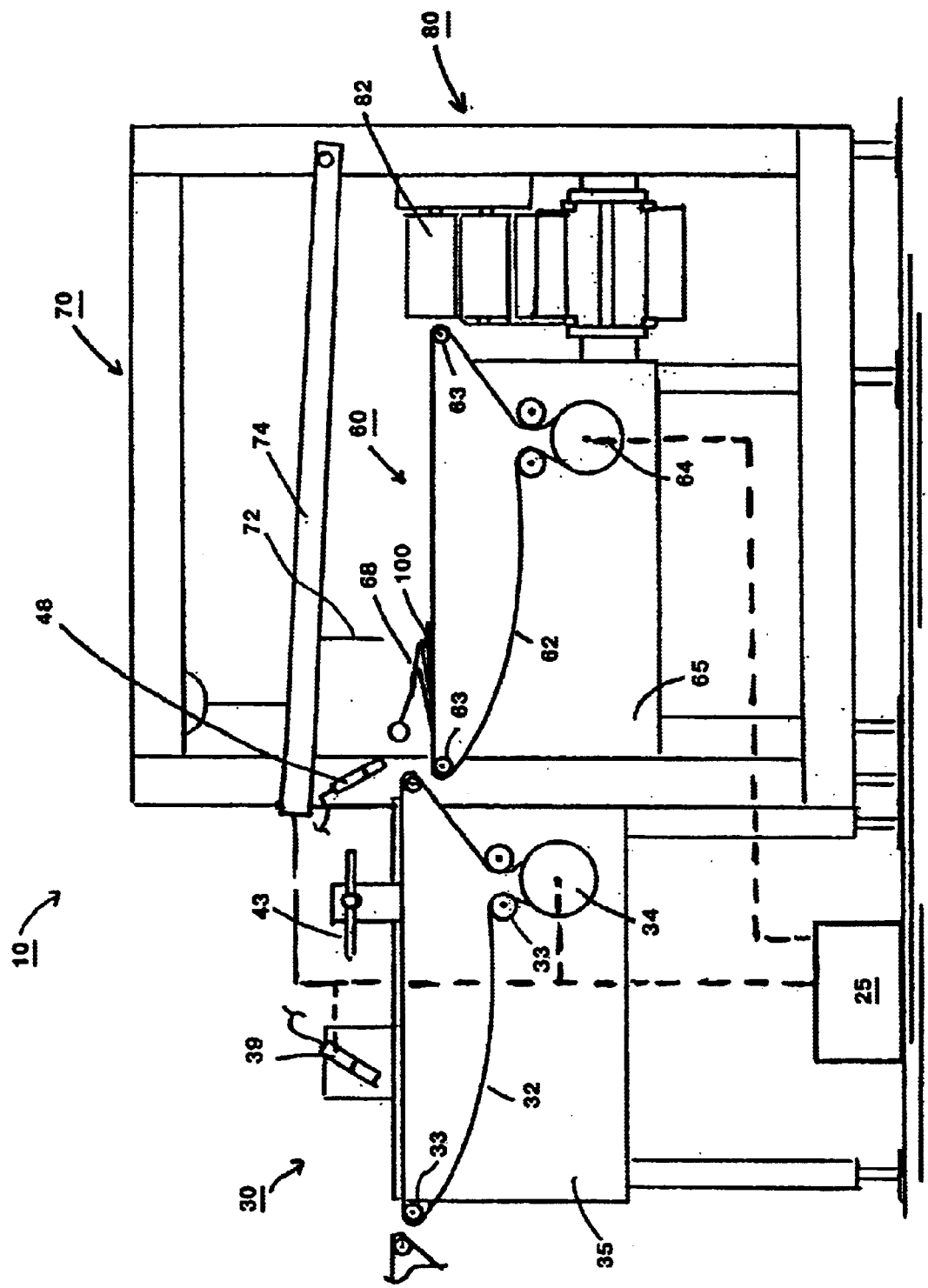
FIG. 1 is a side view of the apparatus for stacking food patties constructed according to the present invention.
Figure 2:
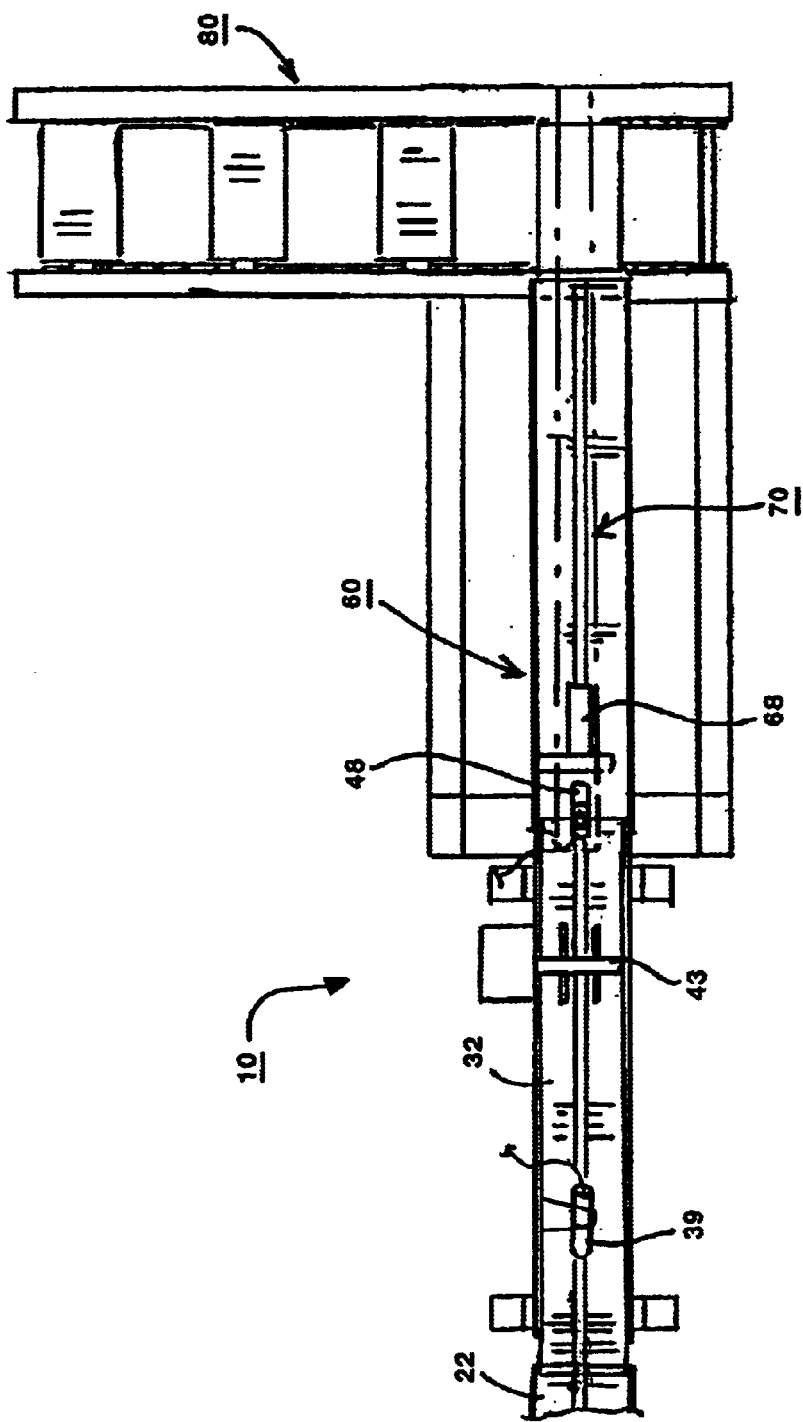
FIG. 2 is a top view of the apparatus of FIG. 1.

As shown in FIGS. 1 and 2, a first aspect of the present invention is directed to an apparatus, shown generally as 10, for counting and stacking food patties, such as frozen hamburgers, into horizontal cylindrical stacks for subsequent packaging, and without requiring human intervention or contact. As those in the art will appreciate, the apparatus described in detail herein is not limited to use on frozen meat patties; rather, the apparatus 10 may be used with any type of food portion, including a patty or slice, meat or non-meat, frozen or unfrozen. Further, the apparatus is also not limited to the counting and stacking of food items, but could be used for counting and stacking other varieties of items where human contact and contamination are undesirable.

Generally, the apparatus 10 is comprised of a first conveying belt assembly 30, a second conveying belt assembly 60, a stacking mechanism 70, and a stack receiver and transport assembly 80.

Figure 3:
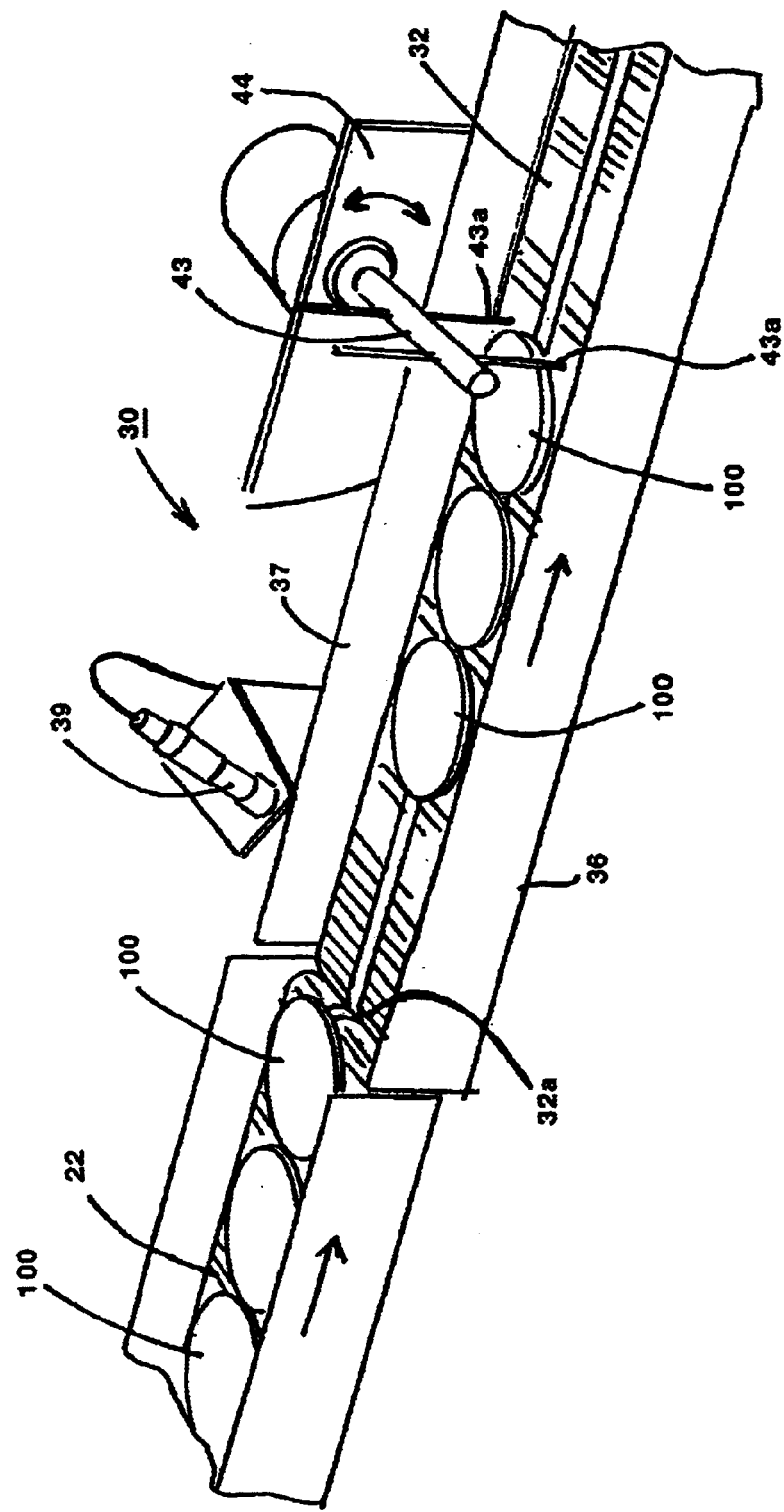
FIG. 3 is a perspective side view of the first conveying belt of the apparatus of FIG. 1.

FIG. 3 is a side perspective view of the first, or receiving, conveying belt assembly 30. Conveying belt assembly 30 comprises a continuous belt 32 assembly that is moved by and across a series of rollers 33. The belt assembly 30 is driven by a computer controlled electrical motor 34; however, a variety of motive drive systems, electrical and non-electrical, may be employed. As shown in FIG. 3, the belt moves in a clockwise direction, from a first, or receiving, end 32a to a second, or discharge, end 32b. The first conveying belt assembly 30 is mounted on a frame 35 that is constructed to support the belt 32 and rollers 33, the drive connections (not shown), and the electric motor 34. The belt 32, from the receiving end 32a to the discharge end 32b, is approximately 36 inches long and approximately 5 inches wide. The belt 32 is a plastic link construction that comprises two spaced apart, parallel tracks, and is available from KVP, Inc. of Rancho Cordova, Calif. While a plastic link belt has been found suitable for the present invention, belts formed of other materials, such as flat fabric, whether as linked constructions or otherwise, may be equally suitable. This width of the belt 32 is slightly greater than the diameter of a frozen hamburger food patty; e.g., about 4.25 inches. First conveying belt end 32a of belt 32 is adapted to receive the frozen food patties from a hopper, or delivery belt 22, as shown in FIG. 3.

The frame 35 is preferably stainless steel or other similar metal that is easily cleaned and maintained sanitary. The electrical motor 34 that drives the first conveying belt assembly 30 is designed to repeatedly and intermittently start and stop belt 32. In operation, the electric motor 34 is sized to move belt 32 at a constant speed of about 127 feet per minute. The electric motor is a ¼ horsepower motor supplied by Lenze of Lawrenceville, Ga., as Series VDE0530. The motor 34 is controlled by a programmed computer 25.

Downstream of end 32a is a first counter 39. This first counter 39 is desirably a diffused electronic eye that is so positioned as to detect and count each food patty intersecting the beam of the eye. One suitable diffused electronic eye is available from Banner Engineering of Minneapolis, Minn. as Model No. S18SP6FF100C. The first counter 39 is mounted to a bracket (not shown) or other support that is secured to the frame 35 of the assembly 30. Downstream of the first counter 39 is a first gate 43. First gate 43 is mounted and supported by bracket 44 that is also affixed to the frame 35. Gate 43 is pivotally attached to bracket 44 and comprises a pivotal attachment and a plurality of tines (forks) 43a that extend downward; however, the particular construction of gate 43 is not critical so long as it adequately prevents any further movement of patties along the belt. Gate 43 is electronically connected to and controlled by the first counter 39. At the second, or discharge end 32b, of belt 32, is a second counter 48, similar to the first counter 39, that is held in place by a bracket 49, also affixed to the frame 35 of the first conveying belt assembly 30.

Figure 4:
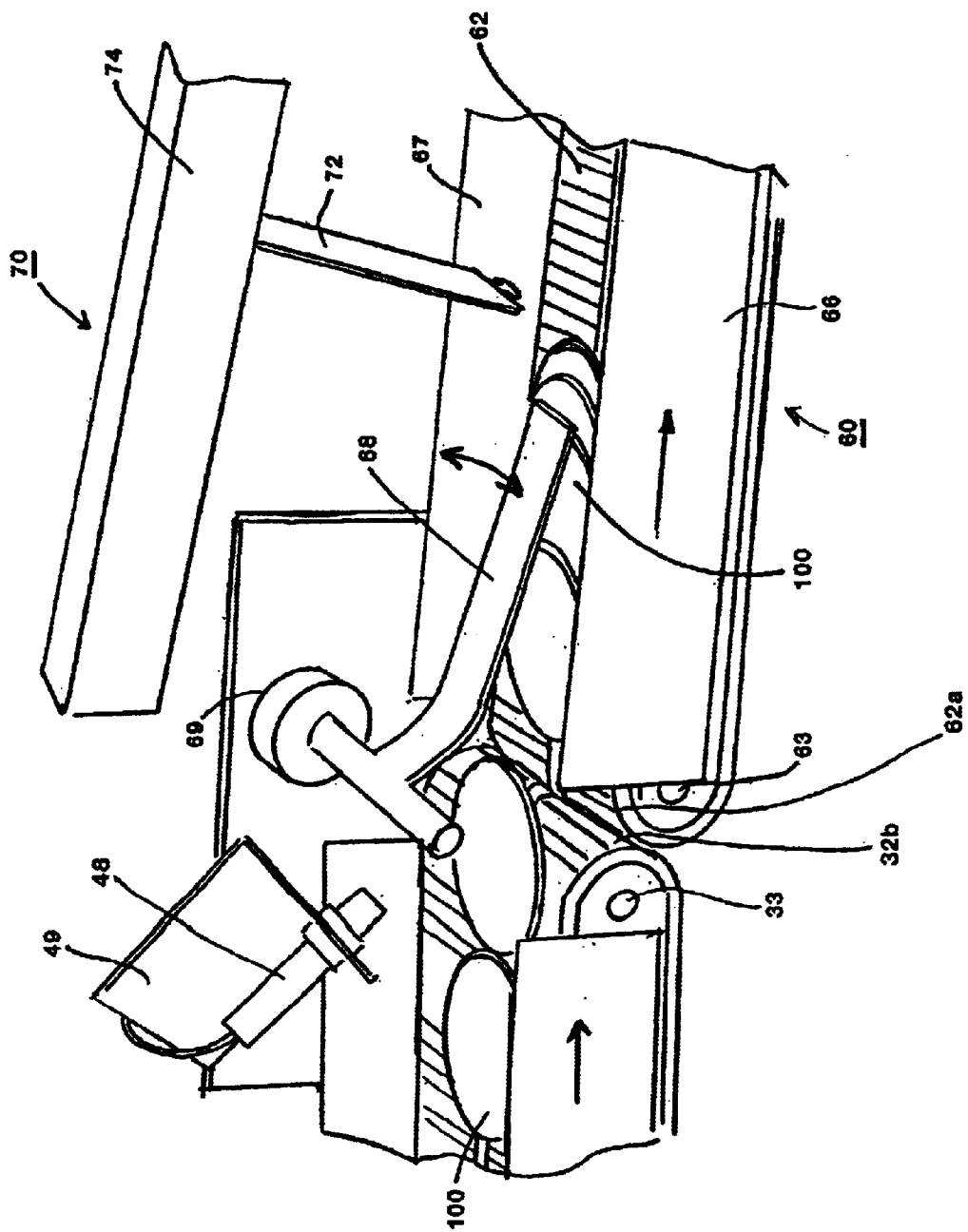
FIG. 4 is a perspective side view of the second conveying belt of the apparatus of FIG 1.

Turning now to FIG. 4, the second conveying belt assembly 60 comprises a belt 62 mounted on and moved by rollers 63 and driven by an electric motor 64 of the same type and rating as the first motor 34. The motor 64 is controlled by the programmable computer 25. The second conveying belt assembly 60 is constructed similar to assembly 30, having a frame 65 that supports the belt 62, rollers 63, drive connections (not shown), electric motor 64, and stacking mechanism 79. Opposed, spaced walls 66 and 67 are affixed to the frame 65 for properly channeling patties moving along the length of the belt 62.

Referring again to FIG. 1, it will be appreciated that the second conveying belt assembly 60, and hence, the second belt 62, is mounted at a slightly lower level (approximately 2.7 inches) than the first conveying belt assembly 30. This assures that the patties dropping off the end of belt 32 at end 32b will properly shingle as they land and slide along belt 62 and onto the previous patties. For ease of reference, belt 62 also has a first, or receiving, end 62a, and a second, or terminal, end 62b. Just downstream of end 62a of the second conveying belt 62, is a second gate 68. This second gate 68 is supported by a bracket 69, similar in construction to bracket 49. Gate 68 is "ski", or lever, shaped. In its initial position, gate 68 is pivotally attached to bracket 69 and slopes downward toward end 62b of belt 62. The downward slope of gate 68 forms an acute angle between the gate 68 and the belt 62 of between about 15 and 20 degrees. This orientation assures consistently proper shingling of patties dropping onto the second belt 62. That is, each patty overlaps about ⅔ of the previous patty.

Figure 5:
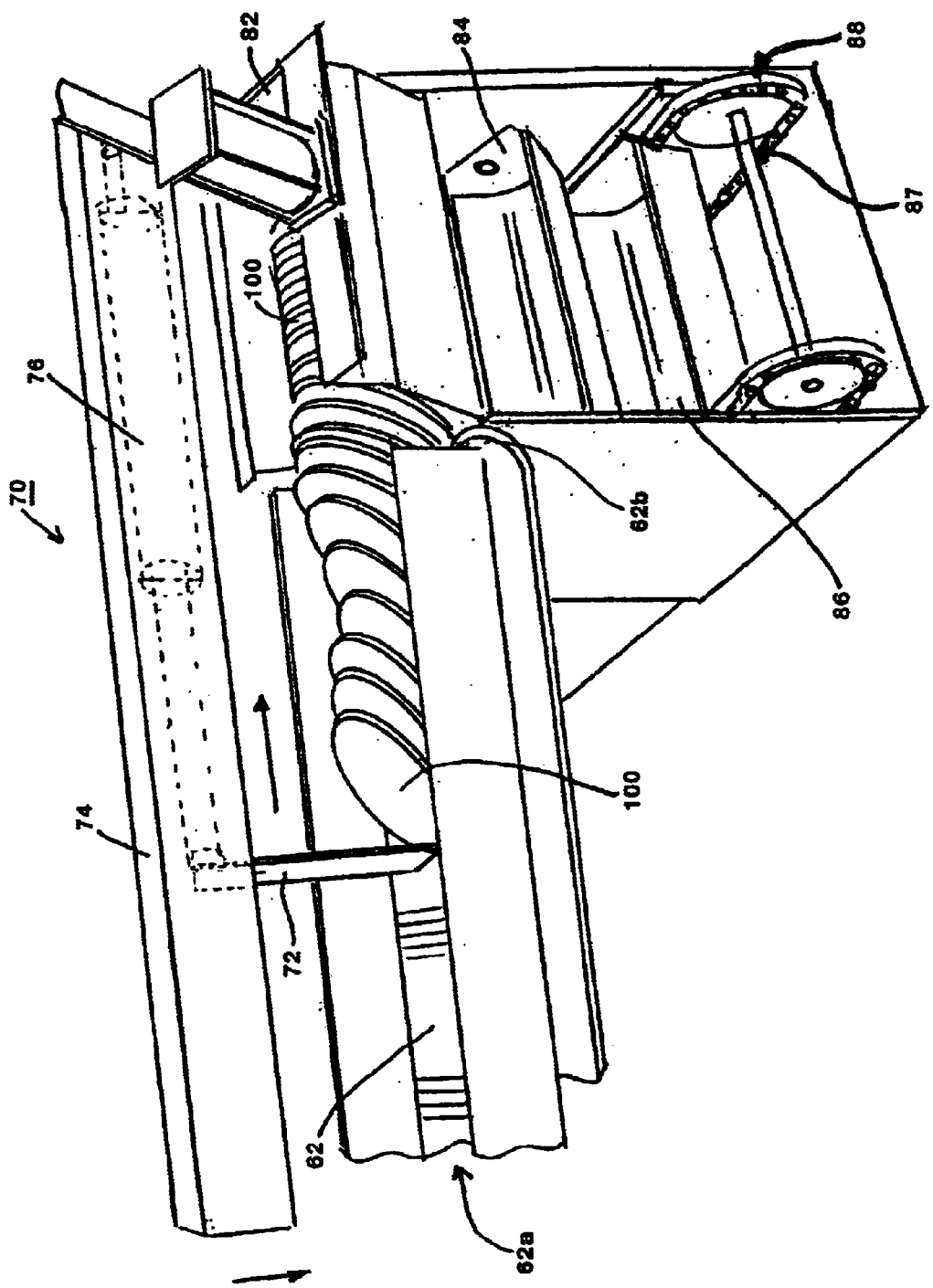
FIG. 5 is a perspective view of the second conveying belt of FIG. 4, illustrating the action of the rake during the stacking step.

Referring to FIG. 5, positioned above the second conveying belt assembly 60 is the stacking mechanism 70. The stacking mechanism 70 comprises an elongate rake 72, a mounting mechanism 74, and servo drive mechanism 76. The stacking mechanism 70 is so configured that the mounting mechanism 74 pivots downward from above the second end of the second conveying belt 62. The relative position and operation of the stacking mechanism 70 is best seen in FIG. 5. This places the stacking rake behind the last patty received on the second conveying belt 62. The servo drive mechanism 76 then causes the stacking rake 72 to move axially toward the second end 62b of belt 62. The servo drive mechanism 76 is a linear servo, available from Linmont of Zurich, Switzerland as Model No. PS01-37X240. As the rake 72 begins to retract toward the second end 62b of the belt, belt 62 begins moving. Rake 72, however, moves at a faster speed, causing the shingled patties to shuffle into a vertical orientation with respect to one another to form a horizontal cylinder of patties. By the time the rake 72 reaches the second end 62b of the second belt, the patties are all vertically-oriented and are pulled into a first receiving bucket 82.

At the discharge end 62b of belt 62 is the stack receiver and transport assembly 80. The stack receiver and transport assembly 80 consists of a first receiving bucket 82, an intermediate transport bucket 84, and a plurality of transport buckets 86. A drive assembly 88 moves the transport buckets 86 to a packing apparatus conventionally known in the art for packaging cylindrical stacks of food items.

Referring now to FIGS. 6A through 6G, the operation and steps of the shingling and stacking process will be described in detail. As will be appreciated by those skilled in the art, a conventional programmable logic controller (PLC) is employed to control the sequence and timing of the operation of the present invention.

Figure 6A:
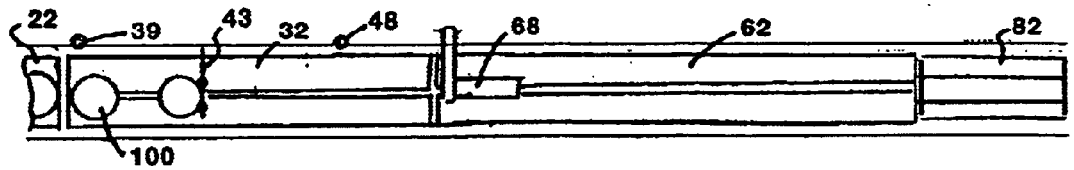
FIGS. 6A through 6G illustrate the logic and steps of the stacking method.

The operation begins as frozen patties 100 such as hamburgers, are moved from a freezer or hopper, or the like, along a delivery conveyer 22 and onto the receiving end 32a of belt 32. Belt 32 moves continuously throughout the entire shingling and stacking cycle. The patties 100 move along belt 32 towards the opposite end 32b, each patty passing under or by counter 39 (FIG. 6A). Gate 43, located downstream of counter 39, and initially in a down, or closed, position.

Figure 6B:
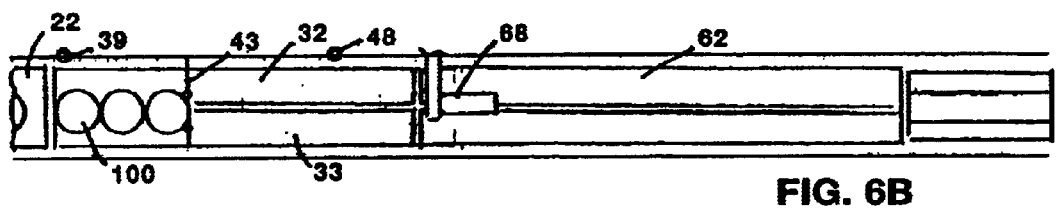

As the patties move along belt 32, they are prevented from forward movement until a predetermined number of the patties, e.g., three (3) have passed counter 39 (FIG. 6B). When counter 39 counts the predetermined number, gate 43, which is electrically interconnected to counter 39, will open and allow the patties to move along toward the discharge end 32b of belt 32.

Figure 6C:
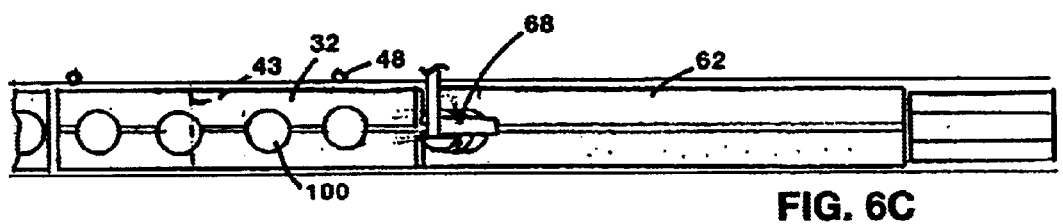

Belt 62 of the second conveying belt assembly 60 is initially not moving and is ready to receive the first patties. Gate 43 is initially in a down, or closed, orientation. As the first patty arrives and drops onto belt 62, it slides forward due to the delivery speed of belt 32 until it is stopped by gate 68. The angle of the gate with respect to the belt causes each succeeding patty (numbers 2 and 3) to shingle atop one another (FIG. 6C).

Figure 6D:
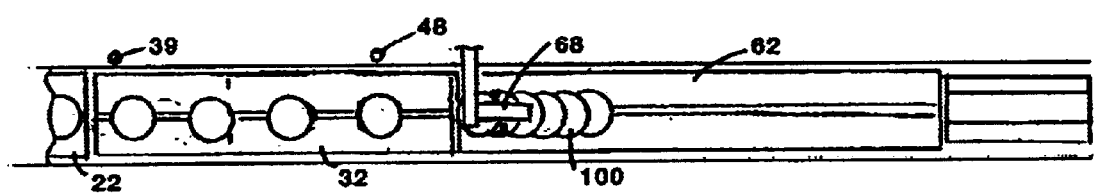
Figure 6E:
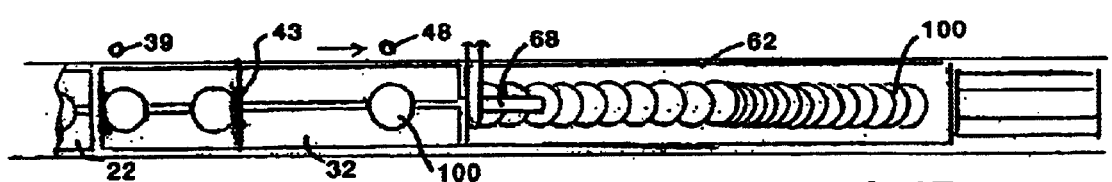
Figure 6F:
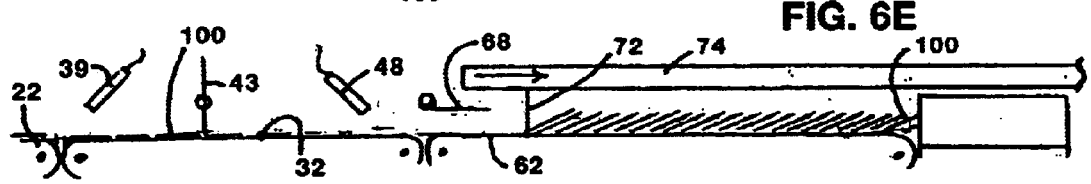

When counter 48 detects that the third patty has passed beneath it, it electronically communicates with gate 68 to raise, allowing the patties to move forward (FIG. 6D). As each succeeding patty passes under counter 48, belt 62 is caused to advance a length sufficient for the shingling of that patty, and so on with each patty, until approximately 25 patties have been shingled in a single row along belt 62. When counter 48 detects that the twenty-fifth patty has passed, belt 62 advances to shingle that patty, and stacking rake 72 is placed in operation. Rake 72 has an elongate portion 72a and a rake projection 72b that extends downward. The rake 72 is caused to extend downward behind the trailing edge of the twenty-fifth patty (FIG. 6F).

Figure 6G:
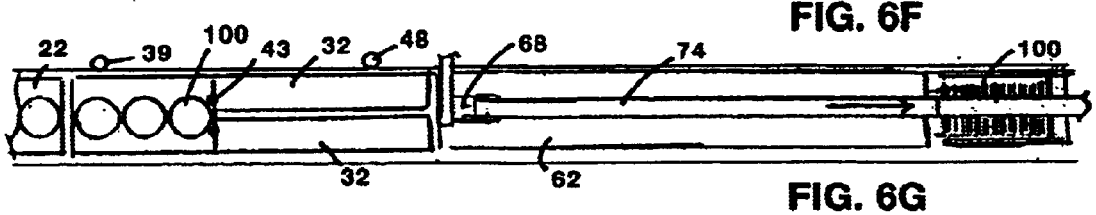

After extending downward, rake 72 moves axially toward the terminal end 62b. This action causes the last, i.e., the twenty-fifth and each preceding patty, to be shuffled vertically together, much like a deck of cards. As rake 72 moves axially towards 62, the patties are all shuffled into a horizontal cylindrical stack that is approximately 8.5 inches long. Rake 72 moves the horizontal cylindrical stack until the stack is pushed into an awaiting empty first receiving bucket 82 (FIG. 6G).

The first receiving bucket 82 has an open top, substantially flat side walls, and a round, or triangular-shaped trough, or bottom, portion. The axial length of bucket 82 approximates the length of the cylindrical stack of twenty-five patties. As soon as rake 72 has deposited the first cylindrical stack of patties into bucket 82, the rake 72 retracts and the entire shingling and stacking cycle begins again. Bucket 82, which is pivotally mounted at its ends, rotates about its long axis to dump the stack of patties into the intermediate bucket 84. A plurality of transport buckets 86 are spaced apart along a continuous chain drive 87, positioned below intermediate bucket 84, at intervals sufficient to match the cycle of each counting and stacking cycle. Thus, after receiving bucket 82 deposits the first stack of patties into the intermediate bucket 84, that stack is synchronized for deposit into the next transport bucket 86 along the chain drive 87. Transport buckets 86 move along the chain drive 87 where they are ultimately received at a packaging point (not shown). The entire counting, shingling, stacking, and transport process has been completed without human contact.

Although the present invention has been described with a preferred embodiment, it is to be understood that modifications and variations may be utilized without departing from the spirit and scope of the invention, as those skilled in the art will readily understand. Such modifications and variations are considered to be within the purview and scope of the appended claims and their equivalents.

We claim:

1. An apparatus for stacking food portions in preparation for packaging, and without human intervention, comprising:
   (a) a conveyor for receiving and moving a plurality of food portions therealong;
   (b) at least one counter for counting each of the plurality of food portions; and
   (c) a stacking rake for moving the plurality of food portions into a stack, wherein the conveyor, counter, and rake are cooperatively interconnected by a programmable computer so that the plurality of food portions are moved along said conveyor where the rake then moves the plurality of food portions axially alone the conveyor to form a stack.

2. The apparatus of claim 1 wherein the conveyor comprises a first conveying belt and a second conveying belt.

3. The apparatus of claim 2 wherein the first conveying belt receives the food patties and deposits each of the patties onto the second conveying belt.

4. The apparatus of claim 3 further including a regulating mechanism associated with the first conveying belt to regulate shingling of patties onto the second conveying belt.

5. The apparatus of claim 4 wherein the regulating mechanism includes a first counter and a gate so positioned with respect to the first conveying belt as to stop and start the shingling of patties onto the second conveying belt.

6. The apparatus of claim 5 wherein the first counter and gate are so interconnected that the gate releases a predetermined number of patties, that number determined by the counter.

7. The apparatus of claim 2 further including a shingling gate, said shingling gate ensuring a proper shingling arrangement of said patties onto the second conveying belt received from the first conveying belt.

8. The apparatus of claim 7 wherein the shingling gate opens upon the receipt of a predetermined number of patties being shingled on the second conveying belt.

9. The apparatus of claim 1 further including a counter so positioned with respect to the conveyor for determining when the predetermined number of patties have been received.

10. The apparatus of claim 1 wherein the stacking rake moves the food portions into a substantially horizontal stack.

11. An apparatus for stacking frozen food patties, comprising:
   (a) a first conveying belt having a first end and a second end, the first conveying belt for moving frozen patties from the first end to the second end;
   (b) a first counter so positioned with respect to said first conveying belt for determining when a first predetermined number of said patties have passed a first selected point along the first conveying belt;
   (c) a first gate so positioned with respect to said first conveying belt to prevent said patties from moving beyond a second selected point along the first conveying belt;
   (d) a second conveying belt having a first end and a second end, the second conveying belt for receiving frozen patties from the first conveying belt in a selected arrangement, the first end of the second conveying belt being so positioned with respect to the second end of the first conveying belt as to receive frozen patties dropping from the second end of the first conveying belt;
   (e) a second counter so positioned with respect to said first or second conveying belt for determining when a predetermined number of said patties have been received on the first end of the second conveying belt;

(f) a second gate so positioned with respect to said second conveying belt as to cause said patties to shingle one upon the other, said gate preventing said patties from moving beyond a first selected point along the second conveying belt until a second predetermined number of patties have been shingled on the second conveying belt; and (g) a rake so positioned with respect to said second conveying belt for shuffling said patties into a horizontal stack at the second end of the second conveying belt for the packing thereof.

12. A method for stacking frozen food patties without human intervention in preparation for packaging, comprising:

(a) moving a plurality of patties along a first conveying belt;

(b) shingling the plurality of patties onto a second conveying belt; and (c) automatically moving a specified number of shingled patties axially along the second conveying belt into a horizontally oriented stack.

13. The method of claim 12 wherein the step of moving the plurality of patties along the first conveying belt comprises providing a first gate means for automatically forming groups of patties of a predetermined number for subsequent movement onto the second conveying belt.

14. The method of claim 13 further including a second gate means is positioned with respect to the second conveying belt to cause said patties to shingle on the second conveying belt.

15. The method of claim 12 further including the step of counting each of the plurality of patties being shingled on the second conveying belt until a specified number are shingled.

16. The method for counting and stacking food patties in preparation for packaging, and without human intervention, comprising:

(a) moving a plurality of food patties along a first conveying belt;

(b) forming a group of patties of a predetermined number on the first conveying belt by;

(c) shingling each of the patties in said group on a second conveying belt;

(d) moving the group of shingled patties along the second conveying belt, wherein additional patties are receiving and shingled to form a shingled row of patties of a predetermined number; and (e) moving the shingled row of patties axially along the second conveying belt into a horizontally oriented stack.

* * * * *